United States Patent [19]

Weiss

[11] Patent Number: 4,926,753

[45] Date of Patent: May 22, 1990

[54] FLEXIBLE MATERIAL TRANSPORT SYSTEM

[75] Inventor: Mitchell Weiss, Haverford, Pa.

[73] Assignee: Programmation, Inc., King of Prussia, Pa.

[21] Appl. No.: 243,141

[22] Filed: Sep. 9, 1988

Related U.S. Application Data

[63] Continuation of Ser. No. 856,992, Apr. 29, 1986, abandoned.

[51] Int. Cl.5 .................. B61J 3/00; B61J 13/04; B60L 11/08
[52] U.S. Cl. ........................... 104/88; 104/118; 104/289; 246/263
[58] Field of Search ............ 104/48, 34, 50, 88, 104/102, 118, 120, 124, 126, 287–289, 295, 301; 105/50, 141, 144, 145; 191/1 R, 2; 320/30; 246/263

[56] References Cited

U.S. PATENT DOCUMENTS

| | | | |
|---|---|---|---|
| 1,454,807 | 5/1923 | Wright | 105/141 X |
| 2,731,922 | 1/1956 | Robb | 105/145 X |
| 2,768,588 | 10/1956 | Robb | 104/120 X |
| 3,010,409 | 11/1961 | DeGood et al. | 105/50 |
| 3,041,983 | 7/1962 | Liversidge et al. | 104/288 X |
| 3,502,038 | 3/1970 | Wesener | 104/88 |
| 3,581,987 | 6/1971 | Tomaro | 104/118 X |
| 3,606,839 | 9/1971 | Stafford et al. | 104/119 |
| 3,610,162 | 10/1971 | Lawrence | 104/118 |
| 3,687,367 | 8/1972 | Schurch et al. | 104/118 X |
| 4,168,760 | 9/1979 | Paul, Jr. et al. | 104/88 X |
| 4,217,727 | 8/1980 | Fetty et al. | 104/295 X |
| 4,416,202 | 11/1983 | Rooklyn | 104/88 |
| 4,554,873 | 11/1985 | Rex | 104/88 |
| 4,570,543 | 2/1986 | Isaikura et al. | 105/50 X |
| 4,630,216 | 12/1986 | Tyler et al. | 104/88 X |

FOREIGN PATENT DOCUMENTS

| | | |
|---|---|---|
| 0111083 | 6/1984 | European Pat. Off. . |
| 0158228 | 10/1985 | European Pat. Off. . |
| 0164302 | 12/1985 | European Pat. Off. . |
| 0291853 | 11/1970 | Fed. Rep. of Germany . |
| 2840215 | 4/1979 | Fed. Rep. of Germany . |
| 0048298 | 4/1979 | Japan .................. 191/1 R |
| 0056403 | 4/1980 | Japan . |
| 305858 | 2/1929 | United Kingdom .......... 104/48 |
| 2147131 | 5/1985 | United Kingdom .......... 104/88 |

OTHER PUBLICATIONS

"Spurgefuhrte Fordermittel: Dezentral Steurn mit Infrarot-Datenubertragung", pp. 829–833, Fordern & Heben, vol. 34, No. 11, Nov. 1984, Ralfs Hat Auch fur Sie Das Richtige Fordersystem.

Primary Examiner—Robert J. Oberleitner
Attorney, Agent, or Firm—Caesar, Rivise, Bernstein, Cohen & Pokotilow, Ltd.

[57] ABSTRACT

A computer controlled transport system for carrying materials, such as semiconductors, to various work stations at spaced apart locations within a common facility. The system comprises a routing controller, a monorail track extending past the work stations and consisting of a plurality of modular track sections. The track sections are interconnected to one another by at least one routing module, such as a turntable, transfer station, etc., to establish plural paths along the track. Plural cars are provided for supporting the materials and carrying them along the track. The cars are battery powered. The system also includes plural control modules located adjacent the track at spaced locations. Each car is individually identifiable and includes control circuitry and communication circuitry. Each of the control modules also includes control circuitry and communication circuitry. The control modules are connected to the routing controller by a local area network. Each of the cars are arranged to communicate with respective ones of the control modules via infrared signals when the car is located at the control module. The control modules, routing controller, and car control circuits cooperate with one another and with the routing module(s) to control the movement of the cars along the monorail track in a predetermined one of the plural paths so that the car can move to selected work stations.

45 Claims, 9 Drawing Sheets

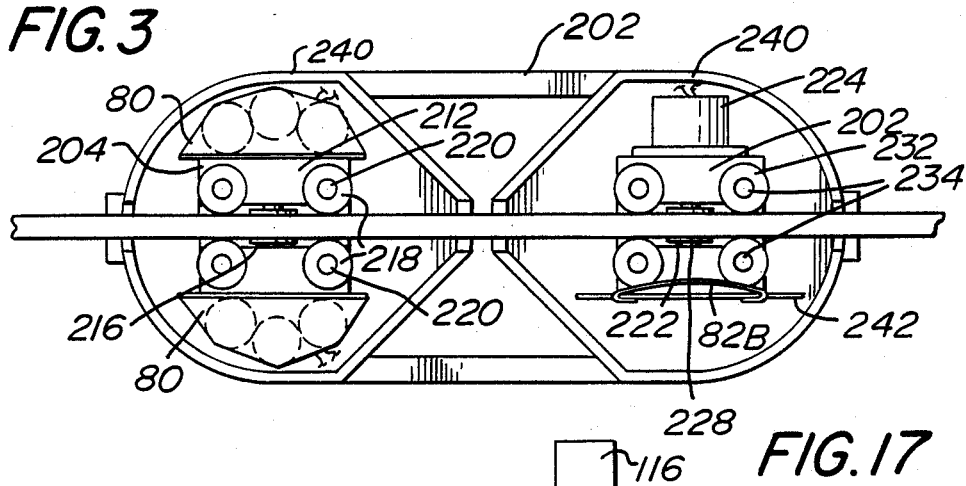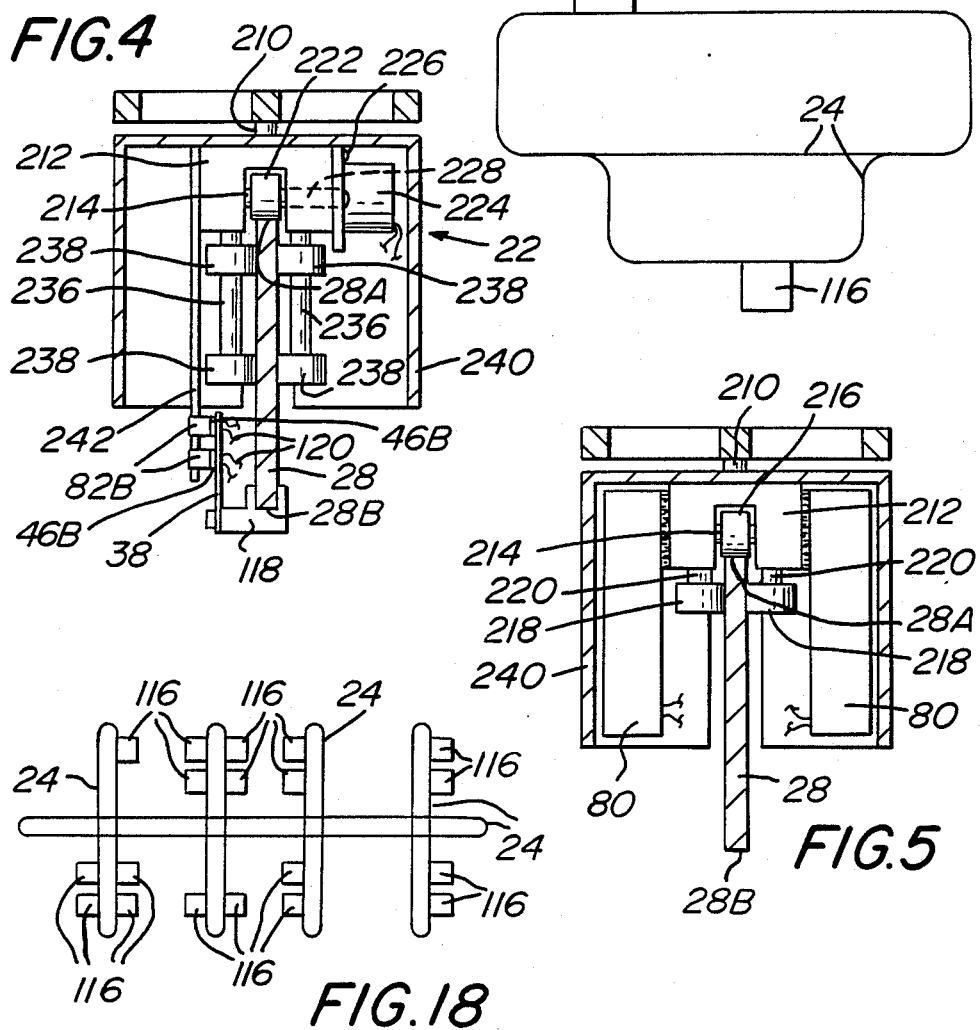

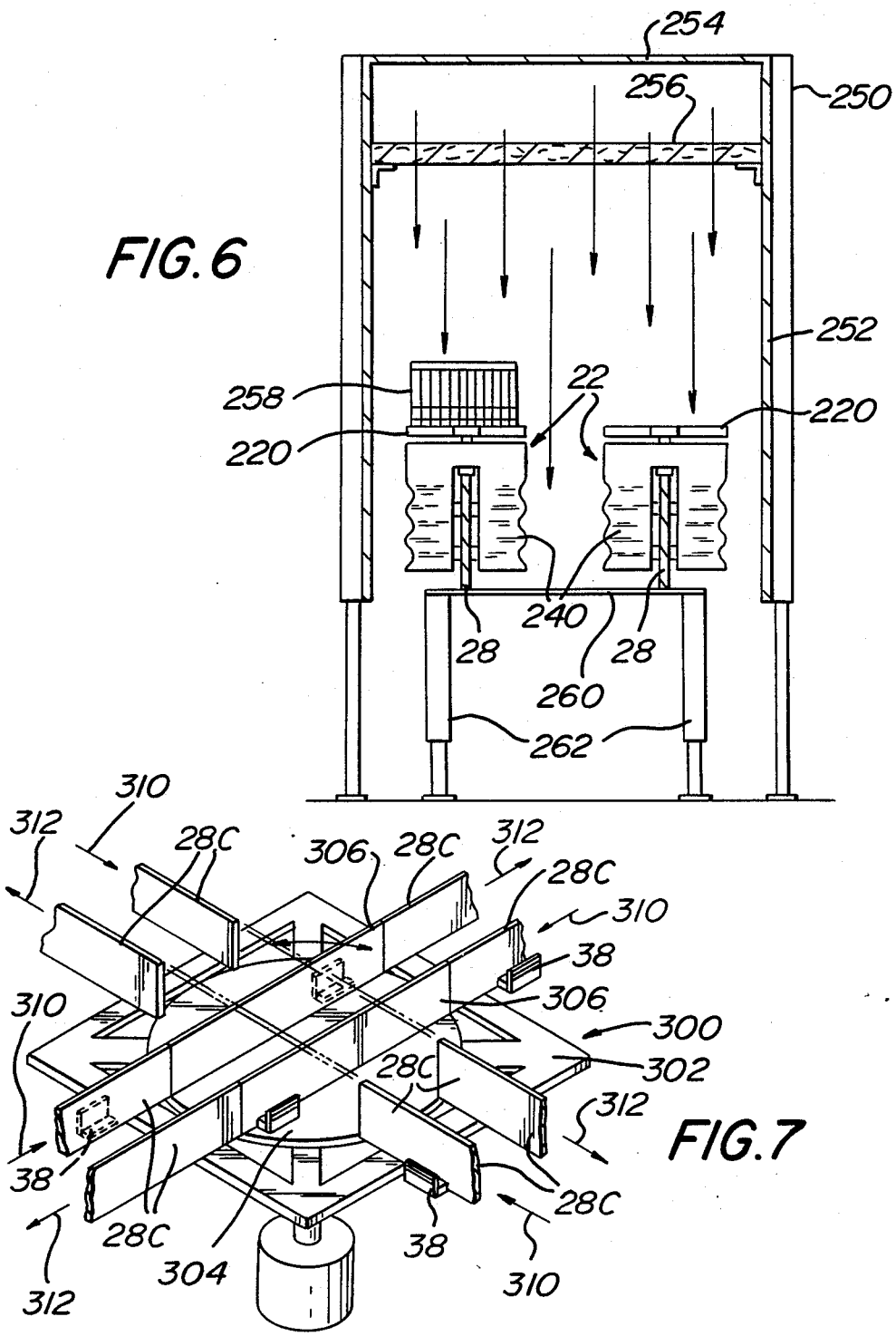

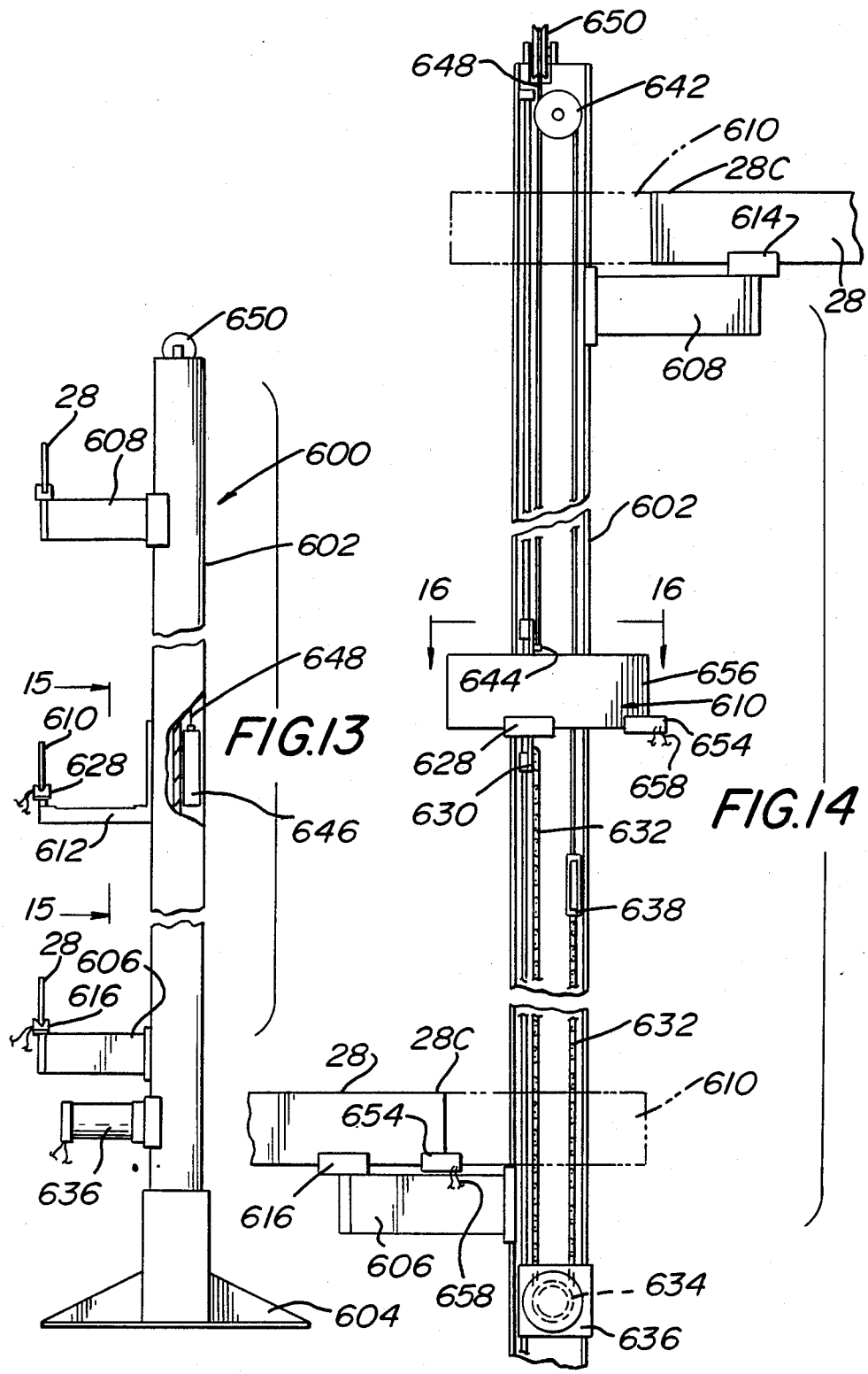

FLEXIBLE MATERIAL TRANSPORT SYSTEM

This application is a continuation of application Ser. No. 856,992, filed Apr. 29, 1986, now abandoned.

BACKGROUND OF THE INVENTION

This invention relates to material handling systems and more particularly to computer controlled systems for moving materials to various locations within a common facility.

As American manufacturing becomes more competitive, the need for increased productivity becomes more acute. Technology has helped to improve productivity in a number of ways. For example, the introduction of numerical controlled machines to the production floor has proved the feasibility of electronically controlled automation equipment in the factory. The introduction of computers has allowed necessary monitoring of production systems to allow for more accurate tracking of production and the ability to adapt more quickly to the demands of the market place. The use of robots has allowed adaptively controlled production systems to adapt the changes in process, demand or design in a realtime fashion. Unfortunately the use of robotics in this fashion has come only at a great expense, both to the manufacturers and users of robots.

For every robot and every tool in a factory there must be some way to present parts or materials to, and to remove parts and materials from, the processing equipment. Unfortunately, the material handling devices have not kept up with the advances seen in other automated equipment in the factory. For example, one of the most commonly used material transport systems, namely a conveyor typically consists of a chain or a belt which is moved along a straight line between two points in the factory. Parts to be handled are carried along by the belt or the chain, sometimes riding in pallet fixtures and sometimes riding directly on the conveyor. The parts may be transported to any location in the factory by devising a system of conveyors and a system of mechanisms which transfer the parts from one element of the system to the other. Generally this results in rough handling of the parts and of limited flexibility in the routing of the materials.

Accordingly, a need exists for a computerized integrated material handling system which is modular in nature, simple in construction and low in cost.

OBJECT OF THE INVENTION

It is therefore a general object of the instant invention to provide a computerized material transport system which overcomes the disadvantages of the prior art.

It is a further object of the instant invention to provide a modular material transport handling system which, while under computer control utilizes distributed processing.

It is a further object of the instant invention to provide a computer controlled material transport system including modular components to be arranged in a wide variety of configurations.

It is a further object of the instant invention to provide a computer controlled material transport system utilizing self-powered, modular, articulated carriers.

It is a further object of the instant invention to provide a computer controlled material transport system which is particularly suited for use in clean environments.

SUMMARY OF THE INVENTION

These and other objects of the instant invention are achieved by providing a computer controlled transport system for carrying materials to various work stations at spaced apart locations within a common facility. The system comprises routing controller means, a monorail track extending past the work stations and having a plurality of modular track sections interconnected to one another by at least one routing module to establish plural paths along the track. The system also includes plural control modules located adjacent the track at spaced locations therealong and self-powered carriers for supporting the material to be conveyed thereon. The carriers are mounted on the track for movement therealong and each is individually identifiable and includes control circuitry and communication circuitry. Each of the control modules also includes control circuitry and communication circuitry. The control modules are connected to the routing controller by a local area network. Each of the carriers is arranged to communicate with respective ones of the control module via signals in the electromagnetic spectrum when the carrier is adjacent thereto. The control modules, the routing controller and the carrier control circuitry cooperate with one another and with the routing modules to control the movement of the carrier along the track in a predetermined one of the plural paths so that the carrier moves to selected ones of the work stations.

DESCRIPTION OF THE DRAWING

Other objects and many of the attendant advantages of the instant invention will be readily appreciated as the same becomes better understood by reference to the following detailed description when considered in connection with the accompanying drawing wherein:

FIG. 3 is a bottom plan view of a carrier forming a part of the transport system of FIG. 1;

FIG. 4 is a sectional view taken along line 4—4 of FIG. 2;

FIG. 5 is a sectional view taken along line 5—5 of FIG. 2;

FIG. 6 is a vertical sectional view of an exemplary work station serviced by the transport system of FIG. 1.

FIG. 7 is a perspective view of a turntable type routing module for use in the system of FIG. 1;

FIG. 13 is a side elevational view, partially in section, of an elevator type routing module for use in the system of FIG. 1;

FIG. 14 is an enlarged side elevational view of a portion of the elevator routing module shown in FIG. 13;

FIG. 17 is a top elevational view of a one exemplary track layout out of a myriad of potential track layouts which can be formed with the system of subject invention;

FIG. 18 is a top elevational view of another exemplary track layout;

DETAILED DESCRIPTION OF THE PREFERRED EMBODIMENT

Figure 1:
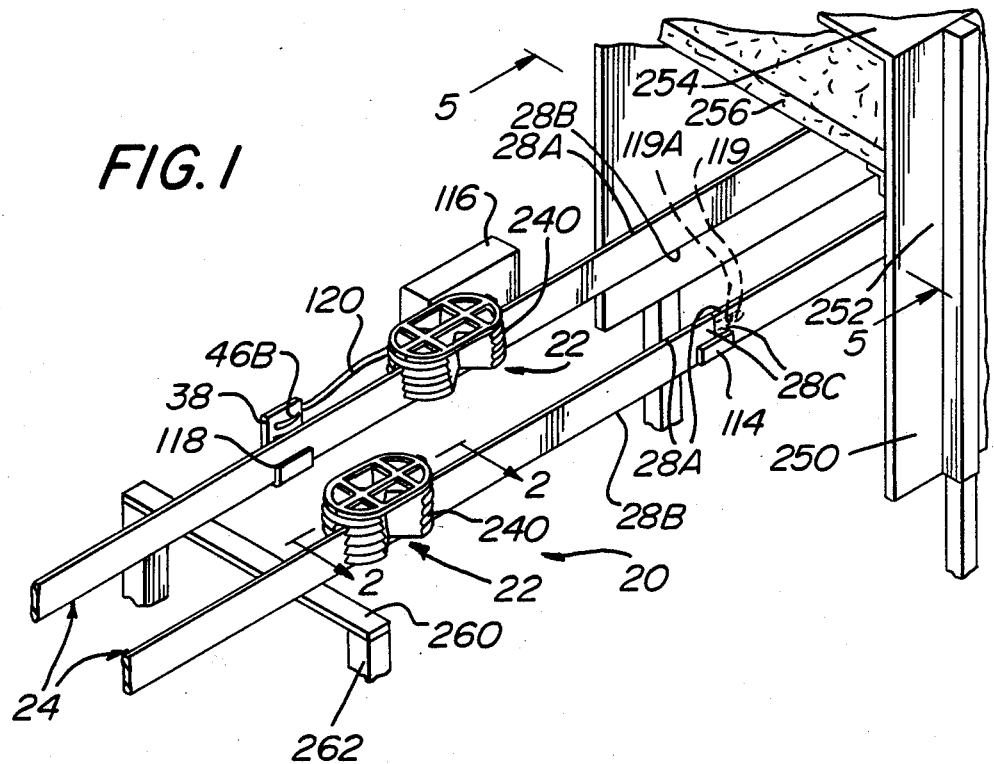
FIG. 1 is a perspective view of a portion of the material transport system of the subject invention, with portions thereof being shown schematically.

Referring now to various figures of the drawing wherein like reference characters refer to like parts, there is shown at 20 a computer controlled material transport system. The system 20 is quite flexible and is designed to transport materials, particularly light materials, to various work stations in a plant or other facility. As will be appreciated from the description to follow the system 20 is particularly useful for semi-conductor processing and for electronic assembly and test, as well as for small parts assembly systems.

Figure 19:
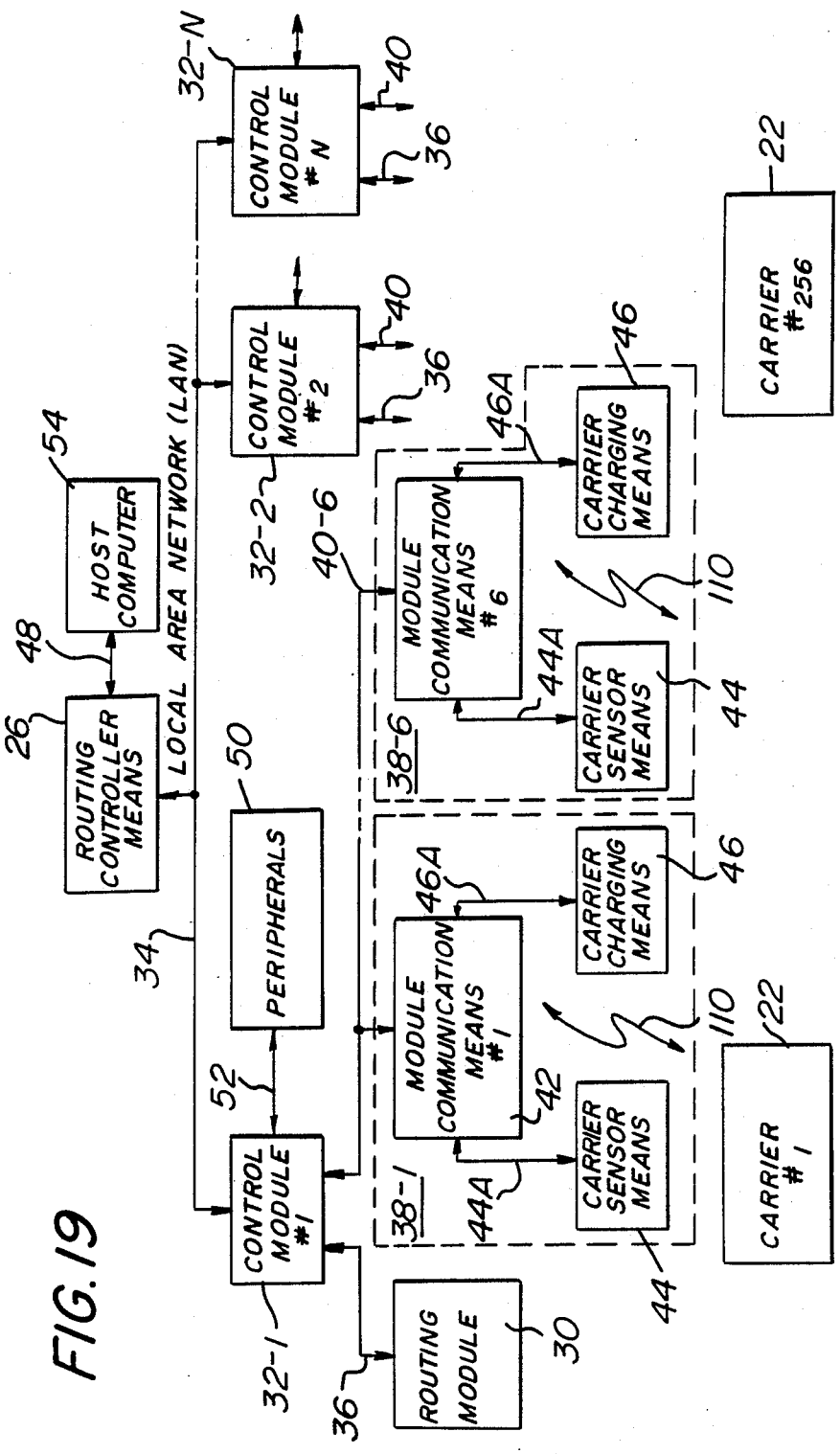
FIG. 19 is a block diagram of the electrical components of the system of FIG. 1.

The system 20 basically comprises a plurality of electrically powered carriers or cars 22 riding on a monorail track 24 under the direction of a central routing controller 26 (FIG. 19). The track is composed of a plurality of modular sections, to be described in detail later, which are inter-connected by a plurality of routing modules. In accordance with this invention a routing module is either a movable element (such as a turntable, a transfer station, a turnout, or an elevator) or a stationary member (such as a curved or straight track section).

The stationary routing modules and the movable routing modules may be combined with the modular track sections in any configuration to allow for optimum flexibility and efficiency in material routing by establishing any desired path for the cars to take to the desired work station location. Control is provided to the movable routing modules and for the carriers via respective control modules, to be described later, which are located adjacent the track at various locations therealong. Each control module has associated with it up to six module communication means in the form of circuit cards, to be described later, for effecting communication with the cars as they reach the location thereof.

In a preferred embodiment of this invention the communication with the carriers is effected via an infrared link. Each car includes a microprocessor or microcontroller and associated communication circuitry which cooperate with the module control cards to effect communication therebetween. Moreover each carrier has a preestablished identification designation or number which is communicated via the infrared link to the module communication card and hence to the control module when the car reaches the card. Each car also includes means for reporting its physical status as well as for detecting objects or other cars present on the track.

Each of the control modules also includes a microprocessor or microcontroller so that each is controlled locally. However, all of the control modules are connected together via a local area network (LAN), to the main routing controller 26. The routing controller 26 instructs the individual control modules on what actions to take at the approach of each specific car 22. The commands for each car are then sent to the car from the control module, via the infrared link, as the car reaches the communication card associated with that control module.

The circuits making up system 20 will now be described and are shown in block diagram form in FIG. 19. As can be seen therein the routing controller means 26 is connected to a local area network 34. A plurality of control modules 32-1, 32-2 ... 32-N are connected to the local area network. Depending upon the particular configuration of the system any number of control modules can be used. Thus, in FIG. 19 the last control module is designated by the reference numeral 32-N.

Associated with each control module is a respective routing module 30. Each routing module establishes a "node" at which some decision regarding the movement of the car is to occur. The routing module is electrically connected to its associated control module 32 via a respective electrical conductor 36. As noted earlier that up to six communication cards can be connected to each control module. This is shown in FIG. 19 where cards 38-1 to 38-6 are shown connected, via electrical connectors 40-1 to 40-6, respectively, to the control module 32-1. Similar cards are connected to the other control modules 32-2 to 32-N of the system. The cards serve as the means for communicating with the cars in the system. Hence the cards can be located at any point along the track where such communication is desired. In most cases the cards are located at nodes in the system.

The module communication cards 38-1 to 38-6 each include module communication circuitry 42 thereon to enable the associated control module to communicate with each car as it reaches the location of that card. Moreover, each card also includes respective car sensing means 44, to be described later, which detect the presence of a car thereat. The car sensing means 44 are connected to respective communication means 42 via respective electrical conductors 44A.

In accordance with the preferred embodiment of this invention each car is self-powered by a rechargeable battery mounted thereon. Each communication card 38 includes means for effecting the charging of the batteries of the car when the car is located at a card. In particular with the subject invention it is most effective to charge a car's battery at a work station or any particular node where a car will typically be stopped for a sufficient period of time. Thus, as can be seen in FIG. 19 each of the six module communications cards 38-1 to 38-6 includes battery charging circuitry 46 which is connected to the module communication means 42 thereof via conductors 46A, so that any selected one(s) can be used to charge the car's battery when the car is located at that card.

Optional peripheral devices 50 may be associated with each control module, and, if used, are connected thereto via respective conductors 52.

In the system 20 the routing controller 26 is responsible for developing the specific path that the car 22 will travel along the track to reach a specific routing module. The destination may be determined by the routing controller 26 itself or from a higher level host computer 54, such as a factory control computer. Thus, the host computer 54 is connected to the routing controller 26 via bus 48.

The path for the carrier to follow is determined as a set of nodes which the car visits in sequence until arriving at the destination. This path information is translated into commands for each routing module to perform as the specific car passes thereby. The routing commands are broadcast over the local area network 34 to the appropriate control modules 32-1 to 32-N, where the signals are stored in associated command control memories (buffers), to be described later. Thus, when a car reaches a module communication card it provides a signal thereto via its infrared link to indicate its identity to the module communication means 42 of that card, and that information is then carried via lines 40 to the associated control module. The control module then searches its command buffer (a memory, to be described later) for instructions on handling that specific car. The command, and hence the routing, of that car is then carried out by the associated routing module under the control of the associated control module. This action relieves the system of real-time control over the routing of cars, thereby simplifying the system greatly and reducing overall costs.

Thus it can be seen that the system 20 makes extensive use of distributed control, with real-time events being controlled locally by the control modules, and with the system or routing controller 26 only being responsible for making high level routing and scheduling decisions. This action is accomplished by placing intelligent controllers, that is, micro controllers, in each of the control modules for the routing modules and in the cars themselves.

Figure 20:
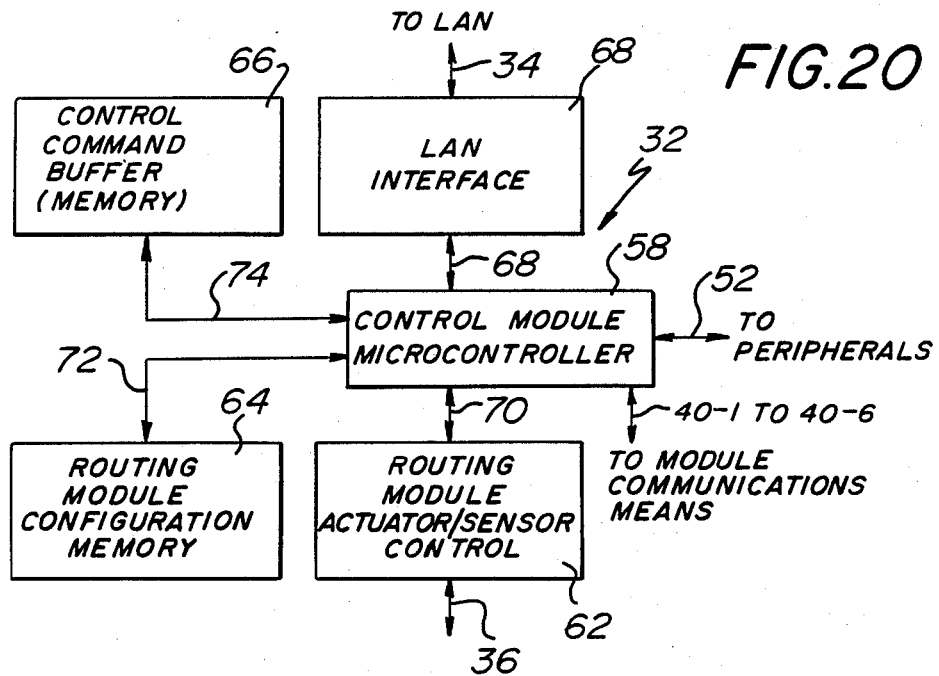
FIG. 20 is a block diagram of a typical control module shown in FIG. 19.

In the block diagram of FIG. 20 there is shown the circuitry making up each of the control modules 32. Thus, as can be seen each control module includes a control module microprocessor or microcontroller 58, a LAN interface circuit 60, a routing module actuator/sensor control circuit 62, a routing module configuration memory 64, and a control command buffer 66. The microcontroller 58 is connected via conductors 68, 70, 72 and 74, to the LAN interface 68, the routing module actuator/sensor control 62, the routing module configuration memory 64, and the control command buffer 66, respectively.

The LAN interface serves as the means for enabling signals to be provided to the the local area network so that the control module microcontroller of each of the control modules can communicate with the microcontrollers of each of the other control modules, as well as other components connected to the local area network.

The control command buffer is an addressable memory which stores signals for the routing of the cars by a particular control module.

The routing module actuator/sensor control circuit 62 includes actuator means (not shown) which serves as the means for causing movable type routing modules, that is turnables, turnouts, elevators, etc., to assume a certain state or condition. The circuit 62 also includes sensor means (not shown) for sensing the state or condition or other parameter of the routing module and providing a signal indicative thereof. Depending upon the construction of the routing module its "actuator" may consist of a motor, a solenoid, or merely a stationary section of track. In the case of a movable routing module the microcontroller 58 provides signals on line 70 to the routing actuator 62 to cause the actuator, e.g., the motor, to move the routing module to its desired position, e.g., rotate a turntable 90°. The sensing means routing module circuit 62 serves to provide signals via line 70 to the microcontroller indicating the position of an associated movable routing module.

The routing module configuration memory 64 serves as the means for storing signals indicative of electrical parameters of the routing module when that module is in a desired position or orientation. For example, the routing module configuration memory stores signals from a potentiometer (not shown) associated with a turntable type routing module (to be described later) when that turntable is in a desired rotational direction. Thus, the control module microcontroller polls the routing module actuator/sensor control circuit 62 to which the potentiometer is connected to determine the position of the turntable. The microcontroller then provides signals to the actuator of the circuit 62 to move the routing module to the desired position (with the desired position being indicated from the sensor of the circuit 62).

The control module microcontroller communicates with the six communication circuits of the respective controller cards 38-1 to 38-6, via lines 40-1 to 40-6, respectively, to transmit and receive signals from a car 20 when it is located at a card.

The mechanical details of the construction of the cars will be described later. Suffice now to state that each car includes circuitry comprising a microcontroller 76, a car identification selector 78, a rechargeable battery pack 80, battery charging means 82, a motor 84, motor control means 86, carrier communication circuitry 88, carrier sensors 90, and a user I/O interface circuit 92.

The carrier motor 84 is an electric motor which is arranged to rotate a drive wheel (to be described later) to cause the carrier to move down the track. The electric power for the motor is provided from the battery pack, via conductors 94, to the motor control means 86 and from there via lines 96 to the motor itself. Control signals for the motor control means 86 are provided from the microcontroller 76 via lines 98. The microcontroller 76 is also connnected via lines 100 to the battery pack 80 to provide power to the microcontroller as well as enabling the microcontroller to determine the status of the battery pack. The micro-controller provides signals to the carrier battery charging means 82 via lines 102 to control its operation to effect the charging of the battery pack when necessary.

In accordance with this invention each module communication card 38 includes a pair of brushes 46B (FIGS. 1 and 3) which are electrically connected to the carrier charging means 46 on the card and are arranged to be engaged by contact brushes 82B (FIG. 4) on the car when the car is located at the card so that electric power is transferred from the charging means on the card to the charging means 82 on the car for charging the battery pack via lines 104.

As mentioned earlier each car is separately identifiable. To that end each car includes identification selector means 78. The selector means preferably comprises an electrical switch which can be set to provide a unique signal identifying that car with any unique number from 1 to 256. The car identification signal is provided via line 106 to the microcontroller 76 for its use and for transmission to the associated control module to facilitate the desired routing of the car.

Communications between the car and the rest of the system 20 are effected by the carrier communication circuit 88 (FIG. 21), which is connected, via lines 108, to the carrier microcontroller 76. The carrier communication circuitry 88 serves as part of the infrared link between the car and the module communications means 42 (FIG. 19) of each control module 32.

As noted earlier each car also includes sensor means for providing a signal indicative of its position at a module communication card 38. Thus, the car sensors 90 basically comprise magnetic sensors mounted on the car and which cooperate with magnets (not shown) mounted on the control cards 38 to provide signals, via lines 112, to the car microcontroller 76. As the car approaches a card under the control of its microcontroller it begins to slow down or creep until it is at the desired position opposite the card 38 for infrared communications to occur. When the car is at that position the magnetic sensor provides a signal to the microcontroller 76 to cause the car to stop. The module communication card also includes similar magnetic sensors (not shown) on it and which cooperate with magnets (not shown) on the car to enable the control module microcontroller to know that the carrier has stopped in the desired position. It should be noted at this juncture the photoelectric sensor means can be used in lieu of the magnet sensor/magnets for providing information as to car positioning.

As mentioned earlier each car also includes means for sensing an obstruction or another car immediately ahead of it on the track. That means basically comprises magnetic sensing components (not shown) mounted on the front of the car and which provides a signal to the microprocessor upon the sensing of an obstruction or car. The car/obstruction sensing means can, if desired, be photoelectric, in lieu of magnetic sensing components.

The user I/O interface circuit 92 provides an interface to the carrier for any other sensors to be used in the system 20.

Referring now to FIGS. 1-4 the details of the monorail tracks will now be described. As can be seen each track section 28 consists of an elongated ribbon-like member whose height is substantially greater than its width. In accordance with the preferred embodiment of the invention each track section consists of an aluminum extrusion which is ¼" (0.634 cm) wide or thick and 6" (15.2cm) high. The top surface 28A of each section of the track is slightly convex (not shown). The extrusion forming the track is also hard coated.

The track sections 28 are secured together at the ends 28C so that they are aligned precisely via respective splice blocks to be described later. In addition alignment pins, also to be described later, are provided to facilitate the alignment of adjacent track sections. The splice blocks and the alignment pins are arranged to enable the track sections to be releasably secured to one another quickly and easily so that a monorail track of any desired shape with any number of branches can be assembled. Thus, the track sections can be of any desired shape, be it straight or curved. In the interests of modularity the track sections are formed in standarized lengths up to twelve feet (3.66 meters) in length and in increments of one foot (0.30 meters).

As can be seen clearly in FIG. 1 the system 20 may be configured as a single monorail track system or a dual monorail track system, that is two tracks disposed side-by-side to one another, and preferably on 12" (30.5 cm) centers. The curved track sections preferably arranged in 90° and 180° turns, with either a 6" (15.2 cm) or 18" (45.6 cm) radius of curvature. All curved sections include 6" (15.2 cm) straight lead in and lead out at each end.

The splice blocks for securing the track sections together are generally channel shaped members 114 mounted bridging the bottom edges 28B of the free ends 28C of the two track sections to be connected. The bottom edge of the abutting ends 28C of the track sections to be joined are disposed within the splice block's channel. The details of each of the splice blocks are not shown in the drawings but one of the sidewalls forming the channel is tapered. A wedge (not shown) is disposed within the channel between the tapered sidewall and the portion of the track sections within the channel to clamp those portions therein without damaging them. A screw (not shown) is provided to tighten the wedge.

As noted earlier the alignment of the two sections is maintained by utilizing an alignment pin. That pin basically comprises a roll pin 119 which is inserted into aligned bores 119A extending longitudinally into the ends 28C of the adjoining track sections adjacent the top edge 28A thereof.

The stationary control electronics for each node of the system, that is the control module 32, the module communication cards 38, the carrier sensor 44 and the carrier charging means 46 are mounted in respective housings 116 located along portions of the track sections adjacent the routing module or work station. The associated module communication cards 38 are mounted on the track sections via brackets 118 (FIGS. 1 and 4) which are constructed somewhat like the splice blocks 114. The cards 38 are electrically interconnected to the electronics within the housings 116 via electrical cables 120.

Referring now to FIGS. 2-5 the details of each carrier or car 22 will now be described. As can be seen each car basically comprises a generally planar platform 200 mounted on a pair of articulated trucks 202 and 204. Truck 202 is located at the front end 206 of the car, while truck 204 is mounted at the rear end 208. The platform 200 is supported on the trucks via respective pivot shafts 210 so that each truck can rotate in either direction about the longitudinal central axis of the shafts 210.

Figure 2:
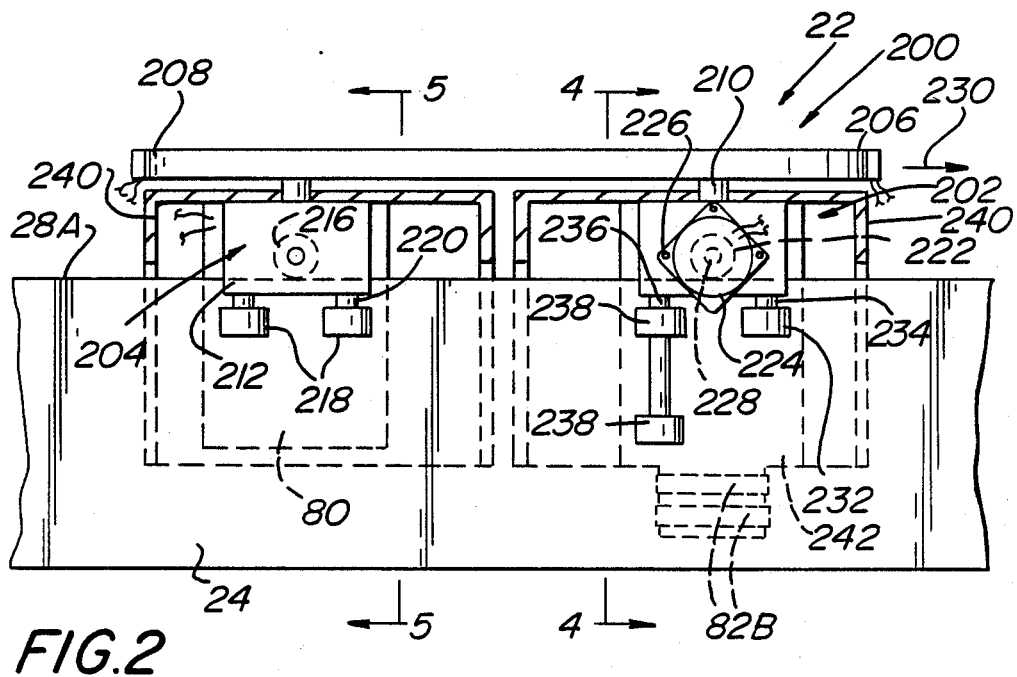
FIG. 2 is an enlarged sectional view taken along line 2—2 of FIG. 1.

Each of the trucks include plural wheels or rollers for supporting and guiding the truck on the track. Thus, as can be seen the rear truck 204 includes a mounting block 212 having a longitudinally extending recess 214 therein. A support wheel or roller 216 is journaled in the recess 214 and is arranged to roll on the top surface 28A of the track 24. Two pairs of guide rollers or cam followers 218 are mounted on vertically extending shafts 220 on each side of the recess 214 and below the block. As seen in FIG. 5 each of the rollers 218 is adapted to engage a respective side surface of the track therebetween so that the truck can roll along the track and around curves while supporting the platform 200 horizontally, even when negotiating sharp turns and with an unbalanced load on the platform. The front truck 202 is constructed similarly to rear truck 204 in that it includes recess 214 rotatably mounting a roller therein. That roller is denoted by the reference numeral 222, but unlike roller 216, roller 222 is powered. To that end an electric motor 224 is mounted on the truck block 212 via bolts 226. The drive roller 222 is fixedly mounted on the rotary output shaft 228 of the motor 224 so that when the motor is operated and its shaft 228 is rotated the roller 224 rotates about the axis of the shaft, thereby engaging the top surface 28A of the track to cause the truck to roll down the track in the direction of arrow 230 (FIG. 2). Like truck 204, truck 202 includes pairs of guide rollers which are adapted to engage the sides of the track. In particular truck 202 includes one opposed pair of guide rollers 232 mounted on shafts 234 extending a short distance below the bottom of the truck to engage the opposed sides of the track adjacent the top edge 28 thereof. Additional guide rollers are provided on elongated vertically extending shafts 236 adjacent the rear end of the front truck 202. Each shaft 236 includes a pair of rollers 238 mounted thereon, with one roller being located at the elevation of roller 232 and with the other roller being mounted on the lower end of the shaft 236 adjacent the bottom edge of the track. The spaced apart rollers 238 engage the sides of the track 24 adjacent the top and bottom edges to further ensure that the truck stays vertically oriented, and thus does not pivot, as it rolls along the track irrespective of the existence of sharp curves in the track or unbalanced loading of material on the car's platform.

As seen clearly in FIGS. 1, 3, 4 and 5 the platform 200 of the car is generally formed as an open lattice work. This feature is of importance when the system 20 is used in applications involving the manufacure of semi-conductors or other products in clean rooms. In such applications it is desirable during the manufacture of the semiconductors that air be passed down from above the car supporting the semiconductors to prevent any dust, dirt, or debris from reaching the semiconductor. Moreover, by virtue of the fact that all of the driving components of the car are located below the platform, any debris created thereby will not reach the materials supported on the car's platform. In the further interests of maintaining a clean system each of the trucks includes a shroud or housing 240 descending downward therefrom and covering all of the components of the car under the platform.

As can be seen in FIG. 3 the carrier battery pack 80 is in the form of two battery packs, each mounted on a respective opposite side of the block 212 of the rear truck 204.

Figure 21:
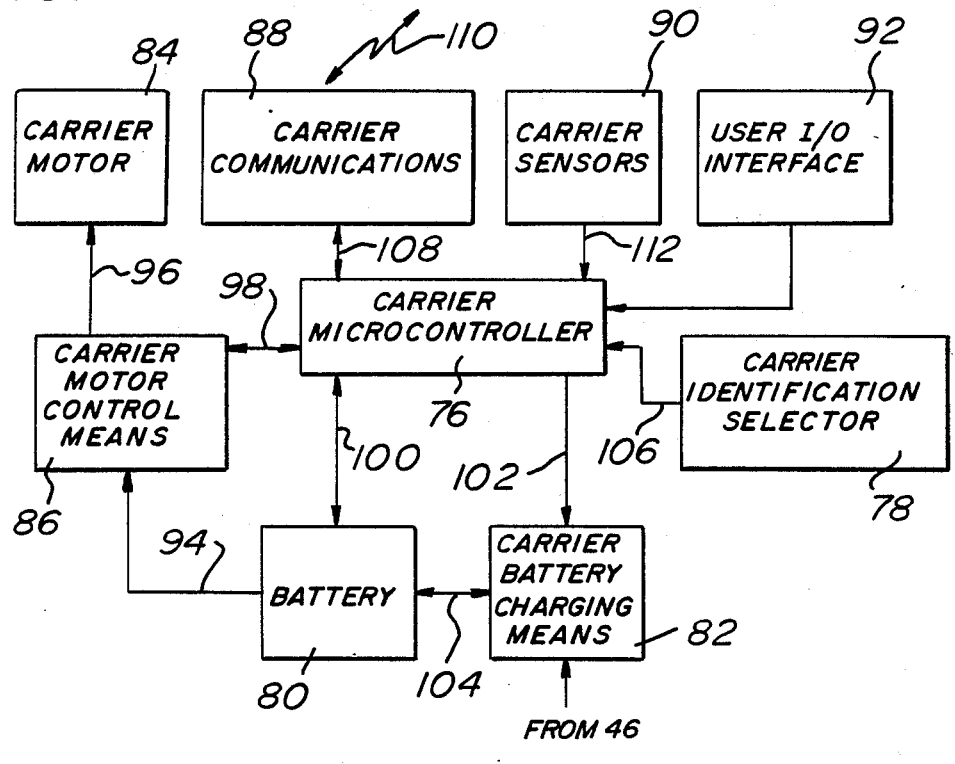
FIG. 21 is a block diagram of the electrical components making up a typical carrier.

The electrical components shown in block diagram form in FIG. 21, other than the carrier motor and batteries, are mounted on a circuit card 242 (FIGS. 2, 3 and 4) which is mounted on the side of the block 212 of the front truck 202. Mounted at the bottom end of the circuit card 242 are the brushes 82B, which, as mentioned earlier, are arranged to engage the brushes 46B of the module communication card 38 (See FIG. 2). The sensors and the means for effecting the infrared transmission of signals to and from the cars are mounted on the car's circuit card 242 adjacent the brushes 82B and communicate with corresponding components mounted on the module communication card 38 affixed to the track.

In FIG. 6 there is shown a portion of the transport system 20 passing through a typical work station, namely, an air tunnel, such as used in a conventional semiconductor fabricating operation. As can be seen therein the tunnel includes a housing 250 having a pair of sidewalls 252 and a top wall 254. Mounted adjacent the top wall is a horizontal disposed HEPA filter element 256. Air is passed down from the plenum above the filter 256 and through the filter, whereupon the air is cleaned of debris. The air then flows in laminar fashion down to the bottom and out of the housing. The open lattice work platform of the cars ensures that they do not disturb the laminar air flow through the tunnel.

Thus, any debris generated by the components making up the car cannot gain egress to the semi-conductor wafers 258, but is instead carried out of the housing 250 by the downward laminar air flow. Moreover, as will be appreciated by virtue of the shape of the tracks, that is their narrow width, such tracks do not disturb the laminar air flow through the tunnel 250, further insuring that a high degree of cleanliness is maintained. In the further interests of cleanliness the tracks are not disposed on the floor but are instead mounted a substantial distance above it. To that end as can be seen in FIG. 6 and FIG. 1 the side-by-side tracks of the system 20 are mounted on trestles 260, with the height of the trestles being adjustable via use of vertically adjustable legs 262.

It should be pointed out at this juncture that while the tracks 24 are shown as being elevated at the same height and disposed in the side-by-side relation, the system can include tracks at different levels if desired. In such applications, if a carrier is to move from one track at one elevation to a track at a different elevation then the system 20 includes an elevator routing module, to be described later.

Referring now to FIG. 7 the details of the turntable type routing module will now be described. That module provides the system with the ability to route cars 22 to any possible path in a four-way intersection. The turntable shown in FIG. 7 is designated by the reference numeral 300 and is a double-lane device, that is it is used in systems having a pair of monorail tracks 24 lying in side-by-side relation such as shown in FIG. 1. Thus, as can be seen in FIG. 7 the turntable 300 basically comprises a support base 302 having a rotatable turntable element 304 disposed thereon. The base 302 is located at the juncture of the free ends 28C of the respective incoming and outgoing track sections 28 forming the four-way intersection. Each free end of track section is disposed adjacent the top of base 302 and contiguous with the periphery of the turntable element 304. A pair of movable track sections 306 are mounted on the turntable element 304. Each section 306 is constructed in an identical manner to track section 28 except that the length of sections 306 are such that each extends across the turntable element 304 parallel to the diameter thereof with the length of each section being the same as the spacing between the free ends of the entrance (in coming) and exiting (outgoing) track sections 28.

The turntable 304 is arranged to be rotated in either rotational direction, as denoted by the double headed arrow 308, under power from its actuator, e.g., an electric motor (not shown). The control for the motor is provided by the routing module actuator/sensor control 62, described earlier with reference to FIG. 20. The turntable motor is preferably constructed identically to that as used for car propulsion in the interest of maintaining a minimum inventory of spare parts for the system 20.

In order to accurately determine the position of a car with respect to the turntable the track sections at the turntable have mounted thereon six module communications cards 38. In particular one card 38 is mounted on the free end 28C of each incoming track section. The incoming track sections are indicated by the incoming arrows 310, while the outgoing track are indicated by the outgoing arrows 312. The system is arranged for the cars to move down the track sections in the direction of the arrows 310 and 312. Each movable track section 306 on the turntable also serves to mount a respective module communication card 38.

Operation of the turntable is as follows: when a car is about to enter a turntable, that is, when the car is located at a card 38 at the end 28C of an incoming track section signals are provided via the communication module means back to the associated control module to indicate the position of the car thereat. If the turntable is not at the desired rotational position to enable the car to move onto the turntable itself, the car remains at the end of the incoming track until the turntable is rotated to the desired position by its motor under the control of the routing module actuator 62. As mentioned earlier the potentiometer associated with the turntable provides signals indicative of the position of the turntable. Thus, when the routing module actuator/ sensor 62 senses the appropriate signal from the potentiometer a control signal is provided to the motor to cease rotation, whereupon the turntable stops at the desired orientation. The car is then given a signal to move onto the associated movable track section 306. Since the movable track section 306 also includes a module communication card 38 mounted thereon when the carrier has moved onto the track section 306 at the location of the card a signal is provided via the module communication means back to the associated control module means. The control module means then provides appropriate signals via the routing module actuator/ sensor control to the turntable motor to rotate the turntable to the desired exit position so that the movable track section 306 is aligned with the track section onto which the car is desired to move (the outgoing track section). The potentiometer provides a signal when the turntable has reached that desired orientation.

Figure 8:
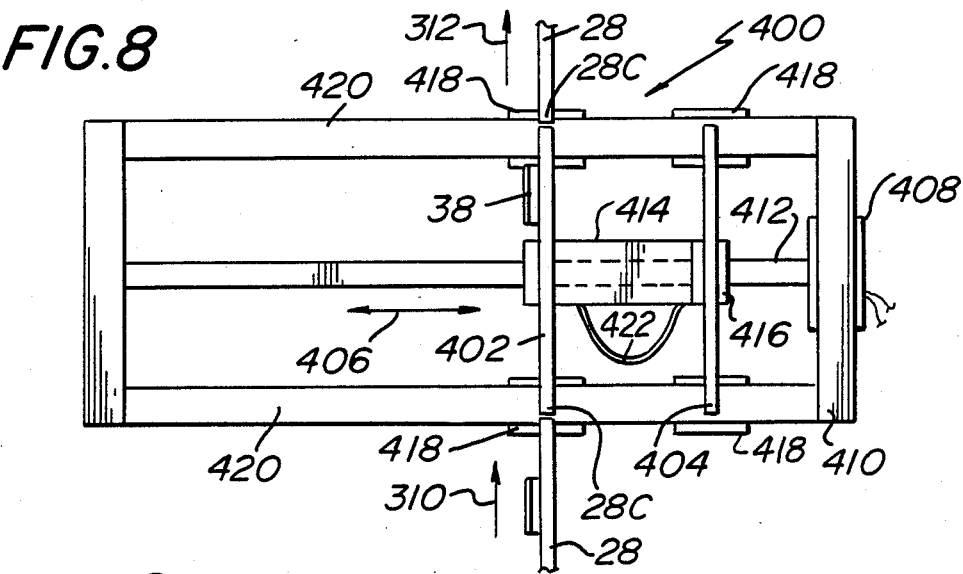
FIG. 8 is a plan view of a transfer station type routing module for use in the system of FIG. 1.
Figure 9:
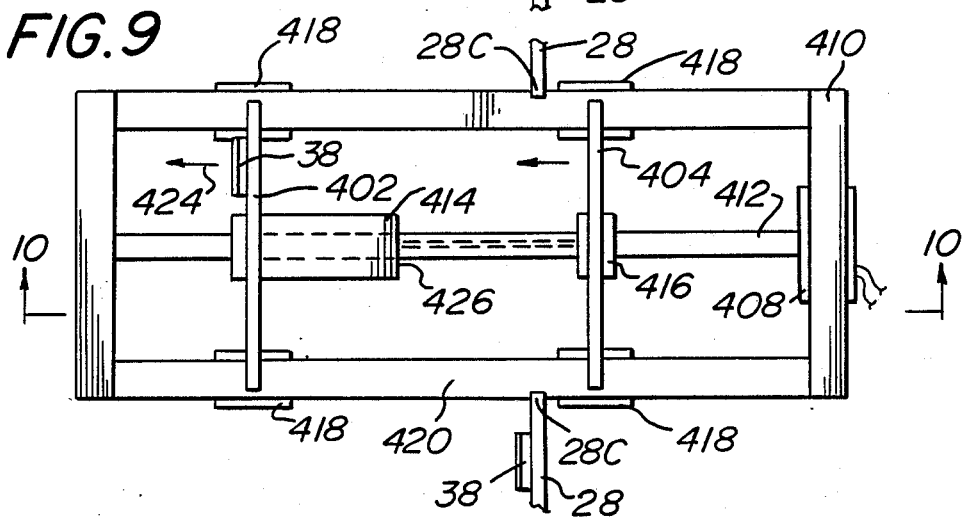
FIG. 9 is a view similar to that of FIG. 8 but showing the transfer station during a transfer mode.
Figure 10:
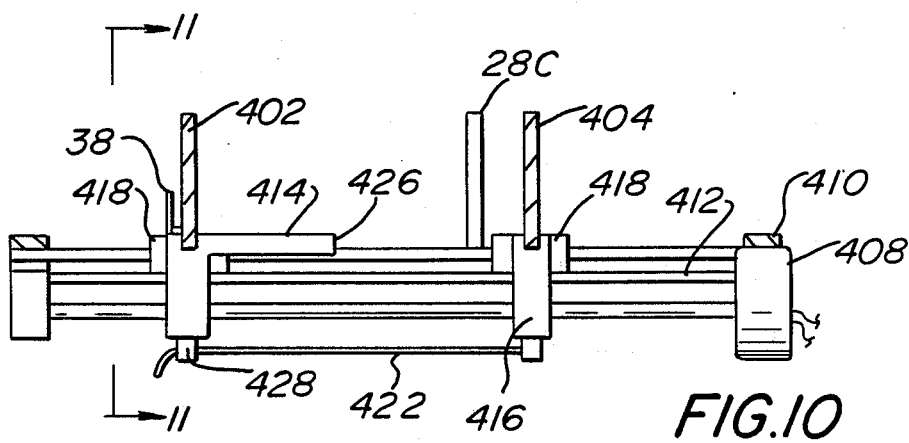
FIG. 10 is a sectional view taken along line 10—10 of FIG. 9.
Figure 11:
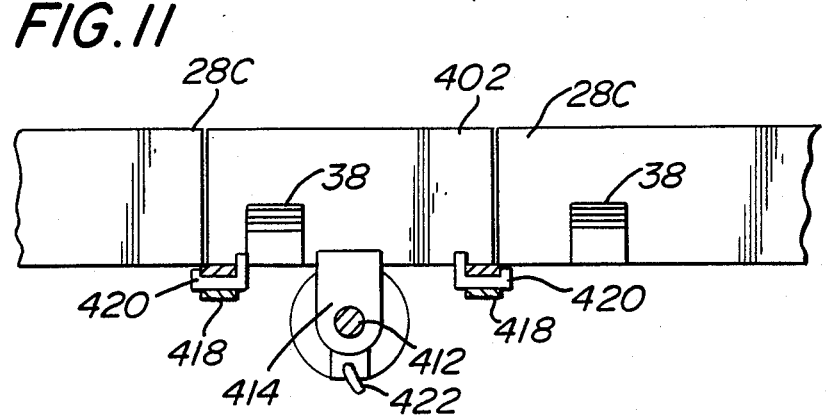
FIG. 11 is a sectional view taken along line 11—11 of FIG. 10.

Referring now to FIG. 8-10 the details of a transfer station routing module will now be described. A transfer routing module is denoted by the reference numeral 400 and serves as a means for shifting a car with a portion of track section out of monorail track to a lateral position, e.g., to a laterally located work station, while shifting another track portion into the gap created. This enables cargo or material to be either worked upon or loaded or unloaded at the lateral position while enabling any other cars in the system to pass the transfer station. In the embodiment shown in FIG. 8, the transfer is shown as comprising only a single track transfer station. Dual track transfer stations are also available, and are appropriately constructed.

As can be seen the transfer station 400 includes a pair of movable track sections 402 and 404. Each section is constructed identically to the other and is configured to fit between the free ends 28C of the transfer station's incoming and outgoing track sections. The track section 402 constitutes what can be called the main transfer track section, while the section 404 constitutes what can be called the idler track section. The main track section is arranged to be moved laterally in either direction denoted by the double-headed arrow 406 so that a car which is disposed thereon can be shifted to a lateral position and back. The idler section 404 is coupled to the main section so that when the main section is moved to its desired lateral position the idler section is located between the free ends of the incoming and outgoing track sections, to thereby provide a clear path for another car to pass by the transfer station.

The movement of the sections 402 and 404 is effected by a conventional screw-type actuator. That actuator basically comprises a motor 408 mounted on a frame 410. The motor includes an output shaft 412 which is arranged to be rotated about its longitudinal central axis. Mounted on the shaft 412 is a support block 414 including a bearing assembly (not shown) therein. The bearing assembly includes angled ball bearings (not shown). The main track section 402 is mounted on the body 414. The idler track section 402 is mounted on a block 416 having an opening through which the shaft 412 passes. Each end of the main track section 402 is connected to a respective bearing block 418, while each end of idler track section 404 is also connected to a respective and similarly constructed bearing block. The bearing blocks 418 are arranged to slide along respective arms 420 of the frame 410. The blocks 416 and 414 are connected together by a flexible, adjustable length cable 422.

The movement of the main and idler track sections 402 and 404, respectively, is as follows: Upon the energization of motor 408 the rotation of shaft 412 in one direction causes the ball bearings in the support block 414 to rotate at an angle to the longitudinal axis of the shaft 412, whereupon the support element 414 moves to the left as shown by the arrow 424 in FIG. 9. When the support block 414 has moved to the left sufficiently far so that the cable 422 becomes taut the continued movement of block 414 in that direction causes the block 416 (and hence the idlertrack section 404) to be pulled in that direction as shown in FIGS. 9 and 10. The two track sections 402 and 404 continue to move to the left until the main track section is at the desired workstation (not shown) and with idler section 404 then disposed between the free ends 28C of the incoming and outgoing track sections 28. Thus other cars on the monorail track can pass by the transfer station.

The use of the adjustable length cable 422 enables one to vary the spacing between the main track section 402 and the idler section 404 to accomodate the needs of the user. Thus, if the track sections 402 and 404 are desired to be spaced further than shown in FIGS. 9 and 10, e.g., the work station is further to the side of the monorail track, the length of cable 422 is lengthened by adjusting clamping means 428 on block 414. Conversly the cable can be shortened to decrease the spacing between the track sections 402 and 404.

When it is desired to shift the main track section back to the position so that it is disposed between the free ends of the incoming and outgoing track section of the monorail the motor 408 is rotated in the opposite direction, thereby causing mounting block 414 to move to the right. When the free end of mounting block 426 engages the mounting block 416 supporting the idler track section 404 the continued movement of the block 414 to the right causes the concommitant movement of block 416. When the section 412 is located between the incoming and outgoing track sections 28 the transfer station is back in its original position as shown in FIG. 8 and ready to shift another car off the monorail to the workstation.

As can be seen module communication cards 38 are mounted on the free end of the incoming track section 28 and on the main movable track section 402. These cards are provided to ensure proper operation of this system. In this regard the card 38 at the free end 28C of the incoming track section ensures that the system knows when a car has reached that position so that if it desired to move the car to a lateral position such action can occur without problem. To that end the car is instructed to move on to main track section 402. When the car is in the appropriate position so that it is aligned with the card 38 mounted on the main section the system then causes the transfer station to move to the left, as described heretofore, thereby moving the car to the lateral position for either loading, unloading or some other operation at a workstation, while the idler section 404 is moved into the gap between the incoming and outgoing track sections to enable other cars to pass thereby.

Figure 12:
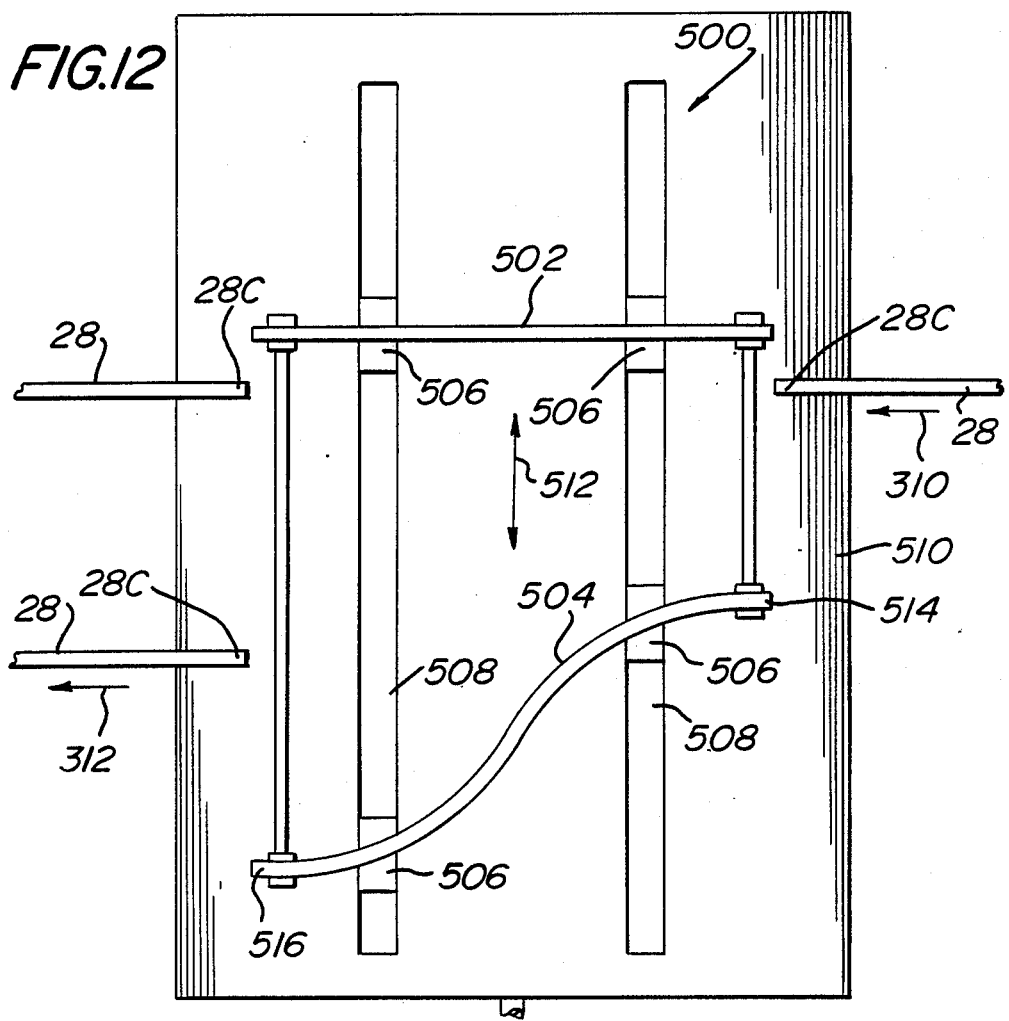
FIG. 12 is a plan view of a turnout type routing module for use in the system of FIG. 1.

In FIG. 12 there is shown a top plan view of a turnout routing module constructed in accordance with this invention. The turnout routing module is arranged to enable a car entering from a single track to exit on one of two tracks, or conversely, to enable cars entering from either of a pair of tracks to exit on a single track. The turnout routing module is denoted generally by the reference numeral 500 and basically comprises a straight track section 502 and an "S" shaped track section 504. The track sections 502 and 504 are mounted on slide elements 506 in slots 508 on a platform 510. The two track sections 502 and 504 are arranged to be slid as a unit with respect to the platform 510 in either direction denoted by the double-headed arrow 512 to bridge the free ends of the incoming and outgoing track sections terminating at the turnout 500. Thus, the straight track section 502 of the turnout is of a length sufficient to fit between the free ends 28C of the aligned incoming and outgoing track sections so that when the track section 502 is located therebetween a car 22 moving in the direction of arrow 310 can pass over track section 502 and exit to the aligned track section 28. If, however, it is desired that the car move onto the laterally disposed track section in the direction of arrow 312 then the turnout is moved so that the end 514 of section 504 is aligned with free end 28C of the incoming track section while the end 516 of the track section 504 is aligned with the laterally disposed outgoing track section.

The free end of the incoming track section 28 has mounted thereon a module communication card 38 so that the system knows when a car is about to enter the turnout.

The actuator means utilized to effect the movement of the track sections forming the turnout may either constitute a motor or a solenoid, or any other suitable component(s).

Figure 15:
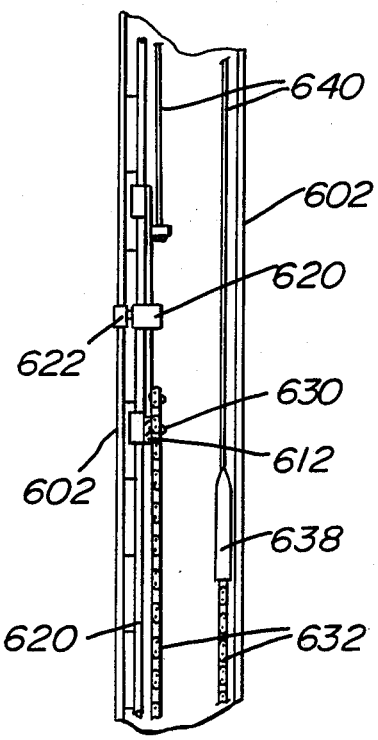
FIG. 15 is an enlarged sectional view taken along line 15—15 of FIG. 13.

Referring now to FIGS. 13-15 the details of the elevator routing module will now be described. As can be seen the elevator routing module 600 basically comprises an elongated vertically oriented post in the form of H-beam 602 and which is supported on the floor via a pedestal mount 604. The beam 602 includes a lower mounting bracket 606 for supporting one end of a lower elevation track section and an upper mounting bracket 608 for supporting one end of an upper track section. The elevator routing module also includes a movable track section 610 mounted on an elevator support arm 612 and arranged to be reciprocated between the lower track section and the upper track section under control of a motor and an associated drive assembly (to be described later) to enable a car to be moved from either a lower track section to the upper track section, or vice versa, as shown by phantom lines in FIG. 14.

As can be seen clearly in FIG. 14 the free end of 28C of the upper track section 28 is mounted on upper bracket 608 via mounting block 614 while the free end 28C of the lower track 28 is mounted on the lower bracket 606 via mounting block 616.

Figure 16:
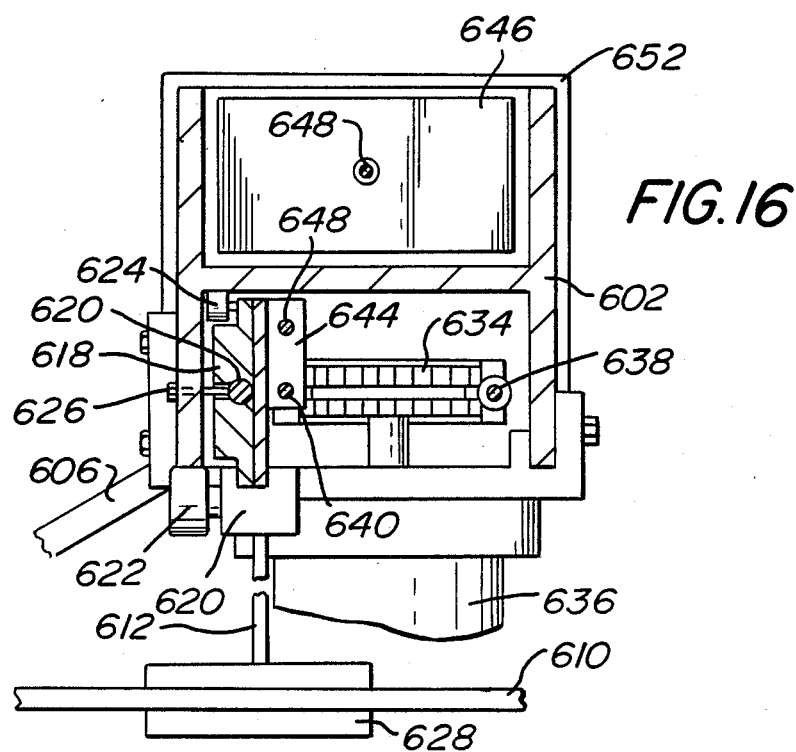
FIG. 16 is an enlarged sectional view taken along line 16—16 of FIG. 14.

As can be seen in FIG. 16 the elevator support arm 612 is mounted on a carrier block 618 and which is adapted to slide along a fixed vertical rod 620 extending along substantially the entire length of the H-beam 602 (FIG. 14). Connected to the front face of the block 618 is a roller support block 620 mounting a follower-roller 622. The follower-roller 622 is arranged to roll on one flanged edge of the H-beam 602. Another roller 624 is disposed parallel to roller 622 to roll along the web of the beam 602. The guide rod 620 is held in place by a plurality of studs 626.

The track section 610 is mounted on the elevator arm 612 via a mounting block 628.

The drive assembly for the elevator basically comprises a combination chain and cable and which is connected to the block 618 and is arranged to be driven by a reversible motor, via a sprocket assembly. Thus, as can be seen in FIG. 14 one end 630 of a plastic sprocket chain 632 is mounted to the lower end of the elevator mounting block 618. The sprocket chain 632 extends downward therefrom and about a sprocket 634 mounted on the rotary output shaft of a reversible electric motor 636. The other end of the sprocket chain 632 terminates at one end in a turnbuckle 638. Connected to the other end of the turnbuckle 638 is one end of a cable 640. The cable 640 passes about a pulley 642 mounted at a top end of the H-beam 602 and terminates at its other end in a connection 644 at the upper end of the elevator mounting block 618. Operation of the motor in one rotational direction causes the sprocket 634 to draw the chain in the counterclockwise direction as viewed in FIG. 14, thereby lowering the elevator track section 610, while rotation of the sprocket in the opposite direction causes the raising of the elevator section 610. The turnbuckle is provided to adjust the tension on the combination chain and cable.

A counterweight 646 is mounted in the rear of the H-beam 602 and is suspended via a cable 648 extending about a pulley 650 mounted at the top of the H-beam 602. The other end of the cable 648 is connected to the connector 644. As can be seen in FIG. 16 the rear of the H-beam 602 is covered by a channel-shaped member 652 to enclose the counterweight 646 within the space between the members 652 and the H-beam 602.

As can be seen in FIGS. 13 and 14 a sensor mounting block 654 is mounted at the free end 28C of the lower track 28 while a similar block 64 is mounted at one free end 656 of the elevator track 610. The sensor block 654 provides signals via electrical conductors 658 to the system to indicate when the elevator is either at the lower track or the upper track.

It should be pointed out at this juncture that although it is not shown in the drawings herein the incoming track to the elevator, be it the upper or lower track 28, has mounted adjacent the free end 28C thereof a module communication card 38 while a similar card is mounted on the elevator track 610. These cards ensure that the system knows when a car has reached the free end of the incoming track so that the elevator track section 610 can be moved to it so that the car can move thereon. The card on the elevator track serves as the means for enabling the system to know when a car has in fact moved on the elevator, in the same manner as described with reference to the turntable and turnout.

Without further elaboration, the foregoing will so fully illustrate my invention that others may, by applying current or future knowledge, readily adopt the same for use under various conditions of service.

I claim:

1. A computer controlled transport system for carrying materials to various workstations at spaced apart locations within a common facility, said system comprising at least one self-powered carrier for supporting said materials thereon, routing controller means having intelligence for determining a route to be followed by each carrier in moving to desired workstations, a track extending past said workstations and comprising a plurality of modular elongated sections interconnected to one another and at least one routing module to establish plural paths along said track, each self-powered carrier being mounted on said track for movement therealong, plural control module means located adjacent to and independent of said track at spaced locations therealong, said plural control module means having intelligent controller means and communication means for transmitting information to and from said intelligent controller means, said carriers including intelligent controller means thereon and communication means for transmitting information to and from said intelligent controller means on the carriers, each of said control module means being coupled to said routing controller means for receiving routing instructions for each car approaching each of said control module means, a communication link between the communication means of the plural control module means and the communication means on each carrier for transmitting information and instructions between the intelligent controller means of each said plural control module means and the intelligent controller means of each carrier via signals when said carrier is adjacent to a respective one of said control module means, whereupon the intelligent controller means of said control module means, said routing controller means, and said intelligent controller means on each of said carriers cooperate with one another and with said routing module to control the path of movement of said carrier along said track in a selected one of said plural paths to move to selected ones of said workstations.

2. The system of claim 1 wherein said carrier includes rechargeable battery means for powering it, said intelligent controller means on said carrier monitoring information indicative of the condition of the battery means and providing instructions via signals to charging means for controlling charging of said battery means.

3. The system of claim 1 wherein said signals are in the electromagnetic spectrum and provide information as to the identity of said carrier and information as to the location of the carrier with respect to said track.

4. The system of claim 3 wherein said signals in the electromagnetic spectrum comprise infrared signals.

5. The system of claim 1 wherein said carrier means comprises a car having a rigid platform supported by a pair of articulated trucks.

6. The system of claim 5 wherein said carrier means includes an electrical motor mounted thereon and coupled to a drive roller, said track being a monorail and said drive roller engaging a portion of said monorail.

7. The system of claim 5 wherein said platform is of an open construction to enable air to freely pass therethrough.

8. The system of claim 1 wherein said track is a monorail and wherein each of said track sections comprises an elongated, vertically oriented, ribbon-like member whose width is substantially smaller than its height, said ribbon-like member having an upper and lower surface and parallel, substantially planar sidewalls extending from said upper surface to said lower surface, said carriers having rotating members engaging said upper surface and sidewalls to aid in moving the carriers along the track.

9. The system of claim 1 wherein said system comprises plural routing modules, each of said routing modules controllable by a respective control module means to establish said predetermined path that said carrier is to take.

10. The system of claim 1 wherein said track includes incoming and outgoing track sections and wherein said routing module comprises turntable means located at the junction of said incoming and outgoing track sections to enable said carrier to take anyone of at least two paths established by said track sections.

11. The system of Claim 10 wherein said turntable means comprises at least one moveable track section disposed between said incoming and said outgoing track sections, said moveable track section being rotatable by actuator means under the control of said control module means to assume various orientations interconnecting respective ones of said incoming and outgoing track sections.

12. The system of claim 11 wherein said control module means controlling the actuator means includes sensing means for sensing the orientation of said movable track section and for providing a signal indicative thereof to the intelligent controller of said control module means.

13. The system of claim 11 wherein said control module means includes means disposed adjacent said movable track section for providing a signal to said intelligent controller of said control module means for indicating the disposition of a carrier on said movable track section.

14. The system of claim 10 wherein said carrier can take any one of at least three paths established by said track sections.

15. The system of claim 1 wherein said routing module comprises transfer station means for transferring said carrier off of said track and to a lateral position to enable any other carrier on said track to pass said station.

16. The system of claim 15 wherein said track includes an incoming and an outgoing track section and wherein said transfer station means comprises a first movable track section, a second movable track section, and actuator means therefor, said first section being arranged to be moved by said actuator means from a position between said incoming and outgoing track sections to a lateral position with respect thereto and said second track section being arranged to be moved by said actuator means to a position between said incoming and outgoing track sections.

17. The system of claim 16 wherein said first and second track sections are disposed parallel to one another and with the spacing therebetween being adjustable.

18. The system of claim 16 wherein a control module means additionally comprising means disposed adjacent said first movable track section for providing a signal to said intelligent controller of said one control module means indicating the disposition of a carrier on said movable track section.

19. The system of claim 1 wherein said track includes three sections defining at least one incoming section and at least one outgoing section and wherein said routing module comprises turnout means located at the junction of said incoming and outgoing sections to enable said carrier to move from one track section to one of the other two track sections or vice versa.

20. The system of claim 19 wherein said turnout means comprises a first movable track section, a second movable track section, and actuator means therefor, said first track section being movable by said actuator mens to a position between one incoming track section and one outgoing track section, said second track section being movable by said actuator means to a position between said one incoming track section and another outgoing track section.

21. The system of claim 20 wherein said actuator moves said first and second movable track sections laterally with respect to the direction of said incoming and outgoing track sections.

22. The system of claim 21 wherein said first track section is linear and said second track section is in the shape of an "S" curve.

23. The system of claim 20 wherein one of said control module means additionally comprising means disposed adjacent said first movable track section for providing a signal to said intelligent controller of said one control module means indicating the disposition of a carrier on said movable track section.

24. The system of claim 1 wherein said track includes an incoming track section disposed at one elevation and an outgoing track section disposed at a different elevation and wherein said routing module comprises elevator means to move said carrier between said incoming and outgoing track sections.

25. The system of claim 24 wherein said elevator means comprises a movable track section mounted on a vertically extending member and actuator means to move said movable track section.

26. The system of claim 25 wherein said actuator means comprises a motor, flexible drive means connected thereto and extending about a pulley and connected to said track section, whereupon movement of said flexible drive means in one direction causes the raising of said movable track section while movement of said flexible drive means in the opposite direction causes the lowering of said track section.

27. The system of claim 26 additionally comprising counterbalance means for said movable track section.

28. The system of claim 25 wherein one of said control module means additionally comprising means disposed adjacent said first movable track section for providing a signal to said intelligent controller of said one control module means indicating the disposition of a carrier on said movable track section.

29. The system of claim 1 wherein said track sections and routing modules are releasably securable to change the configuration of said track.

30. The system of claim 1 wherein said track is a monorail and wherein said track sections are of predetermined standardized lengths up to twelve feet (3.66 meters) long and in increments of one foot (0.30 meters) lengths.

31. The system of claim 30 wherein at least one of said track sections is straight.

32. The system of claim 30 wherein at least one of said track sections is curved, having a minimum radius of curvature of six inches (0.15 meters).

33. The system of claim 30 wherein at least one of said track sections is curved, having a minimum radius of curvature of six inches (0.15 meters) and at least one of said track sections is straight.

34. The system of claim 1 wherein said routing controller means provides signals via a local area network to said plural control module means for establishing said path.

35. The system of claim 1 wherein each of said control module means includes buffer means for storing signals received from said routing control means, said intelligent controller means and communication means of each of said control module means communicating signals stored in the buffer means to the communication means and intelligent controller means on said at least one carrier for providing instructions to the carrier through the intelligent controller on said carrier, whereupon said routing controller means is relieved of real time control over the movement of the carrier along said predetermined path.

36. The system of claim 1 wherein said control module means comprises routing module actuator control means for establishing the state of the routing module.

37. The system of claim 36 wherein said control module means additionally comprises carrier sensing means and local area network interface means, and wherein said system comprises a local area network for coupling said plural control module means to said routing controller means.

38. The system of claim 37 wherein said carrier is powered by a rechargeable battery means mounted thereon and wherein said control module means additionally comprises means for effecting the charging of the carrier battery means.

39. The system of claim 1 wherein said carrier includes a motor and motor control means for controlling the operation of said motor to effect movement and stopping of said carrier, said carrier motor control means being operated by control signals provided by the intelligent controller on the carrier.

40. The system of claim 39 wherein said carrier additionally comprises means for providing a signal to said control module means indicating a unique designation of said carrier.

41. The system of claim 40 wherein said control module means comprises routing module actuator control means for establishing the state of the routing module, said routing module actuator control means being operated by the intelligent controller means of said control module means.

42. The system of claim 41 wherein said control module means additionally comprises carrier sensing means and local area network interface means and wherein said system comprises a local area network for coupling said control module means to said routing controller means.

43. The system of claim 42 wherein said carrier is powered by a rechargeable battery means mounted thereon and wherein said control module means additionally comprises means for effecting the charging of the carrier battery means.

44. The system of claim 1 wherein said control module means is coupled to said routing controller means by a local area network.

45. A transport system for carrying material to various workstations at spaced-apart locations within a common facility, said transport system comprising a track extending past said workstations and at least one self-powered carrier for support said material thereon, said at least one carrier including a rechargeable battery means for powering it, characterized in that said carrier includes a charging means for the battery means, intelligent controller means for monitoring information indicative of the condition of the battery means and for providing instructions via signals to said charging means for controlling charging of said batter means, said intelligent controller means being powered by said battery means.

* * * * *